(12) United States Patent
Vargantwar

(10) Patent No.: US 8,570,888 B1
(45) Date of Patent: Oct. 29, 2013

(54) DYNAMIC REVERSE ACTIVITY BIT OFFSET ADJUSTMENT BASED ON RF CONDITIONS

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 368 days.

(21) Appl. No.: 12/981,012

(22) Filed: Dec. 29, 2010

(51) Int. Cl.
*G01R 31/08* (2006.01)
*H04B 7/185* (2006.01)
*H04B 7/216* (2006.01)

(52) U.S. Cl.
USPC ............ 370/252; 370/317; 370/320; 370/335

(58) Field of Classification Search
USPC .......... 370/229–240, 328–344; 455/436–453
See application file for complete search history.

(56) References Cited

U.S. PATENT DOCUMENTS

| | | | |
|---|---|---|---|
| 2003/0142647 A1* | 7/2003 | Agrawal et al. | 370/331 |
| 2006/0029026 A1* | 2/2006 | Willenegger et al. | 370/335 |
| 2010/0091791 A1* | 4/2010 | Willenegger et al. | 370/465 |
| 2010/0142479 A1* | 6/2010 | Black et al. | 370/331 |

OTHER PUBLICATIONS

Unpublished U.S. Appl. No. 12/834,045, entitled "Dynamic Reverse Activity Bit Offset Adjustment Based on Soft Handoff Ratio" filed Jul. 12, 2010 in the name of Sachin R. Vargantwar.

* cited by examiner

*Primary Examiner* — Brandon Renner

(57) ABSTRACT

A method and system is disclosed for dynamic reverse activity bit (RAB) offset adjustment based on RF conditions. A base station controller (BSC) or radio node controller (RNC) or similar network device will determine a rate of decrease of aggregate reverse-link noise measured at a sector, and from the decrease rate the BSC will further determine an amount of time needed for the sector to detect the aggregate reverse-link noise to cross below a threshold level. The BSC will then set a RAB offset for the sector to be at least as large as the determined amount of time.

22 Claims, 8 Drawing Sheets

DYNAMIC REVERSE ACTIVITY BIT OFFSET ADJUSTMENT BASED ON RF CONDITIONS

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC) or a radio node controller (RNC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. The multiple soft handoff sectors are referred to as the AT's "active set" sectors. As the AT moves beyond the threshold range of one or another of its active sectors and into the range of one or more other sectors, usual handoff procedures are used to update the sectors of the AT's active set.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

In one of the power-control procedures, the base station monitors the aggregate reverse-link noise and interference resulting from the combined transmissions of active ATs in a sector or cell (or other form of coverage area), and periodically broadcasts a noise-indication message that reflects the aggregate reverse-link noise level measured by the base station. More specifically, the base station broadcasts a message to all ATs it is serving indicating whether or not the measured noise level exceeds a threshold noise level. In turn, each AT with an active call or session in the sector may then respond by adjusting its reverse-link power.

While the specific procedures followed by an individual AT in response to a received noise-indication message will not necessarily result in an immediate adjustment (down or up) in the AT's reverse-link power, the aggregate effect of the average response to a given noise-indication message of all ATs in a given sector will be in accordance with the desired effect of the message. Namely, if the message indicates that the threshold has been exceeded, the average response of each AT will be to reduce its reverse-link power, and the overall effect (i.e., of all active ATs in the sector) will be a reduction in aggregate reverse-link noise, possibly to a level below the threshold. Those ATs that reduce their reverse-link power will likely also have to reduce their reverse-link data transmission rate. Conversely, if the message indicates that the threshold has not been exceeded, the average response of each AT will be to increase its reverse-link power and correspondingly its reverse-link data transmission rate. In the case of increased power, the overall effect will be an increase in aggregate reverse-link noise, possibly to a level that exceeds the threshold.

It may happen that a portion of the aggregate reverse-link noise present in one sector contributes to the aggregate reverse-link noise in a second, geographically adjacent or nearby sector. This can occur, for example, when there is a group of access terminals that are all in soft handoff with both sectors at the same time. If both sectors broadcast their respective noise-indication messages at the same time, then the group of common soft handoff ATs will respond to both sectors at the same time. In this case, a noise-indication message signaling a need to reduce aggregate reverse-link power in one sector will trump a message signaling permission to increase aggregate reverse-link power in the other sector, and both sectors will tend to see a decrease in aggregate reverse-link power. Depending on the size of the group of common soft handoff ATs, as well as the particular noise-indication messages from each sector and the net decrease or increase in reverse-link noise in response to the messages (among other factors), simultaneous broadcasts of noise-indication messages by both sectors can lead to a "ping-pong" effect of aggregate reverse-link power, wherein the aggregate reverse-link power in both sectors alternately increases and decreases with each periodic (and simultaneous) noise-indication message. This condition can be compounded when more than two adjacent sectors share a single common group of soft handoff users, or share different common groups in pair-wise fashion.

To help avoid this ping-pong effect of simultaneous broadcasts of noise-indication messages, adjacent or geographically-nearby sectors can be configured to broadcast their respective noise-indication messages at slightly different times. This can be achieved by introducing time offsets between the periodic broadcasts from the sectors. By doing so, a sector that broadcasts later (i.e., with larger time offsets) gets a chance to observe the effects on aggregate reverse-link noise of an earlier broadcast (i.e, one with smaller time offsets), and possibly revise the content of its noise-indication message compared with what it would have broadcast at the earlier time (i.e., if broadcasts were simultaneous). In conventional operation, the time offsets used between periodic noise-indication broadcasts from adjacent sectors are statically configured among the sectors.

While using time offsets between periodic noise-indication broadcasts from adjacent sectors can help mitigate ping-ponging of aggregate reverse-link power levels, the use of static time offsets forecloses on the possibility of considering dynamic operating conditions in the setting of time offsets. In particular, the rate of change of aggregate reverse-link power observed in a given sector as a result of a noise-indication message broadcast by a neighboring sector can depend on various factors, including the number of ATs commonly in handoff in both sectors, and distances between the AT and the respective BTSs of the two sectors, among others. The confluence of these (and related) factors may be considered as generically describing RF conditions.

For the situation in which both the given and neighboring sectors measure reverse-link aggregate power above the threshold level, and in which the neighboring sector is the first to broadcast a noise-indication message instructing ATs to reduce their reverse-link power, the rate at which the given sector observes the resulting decrease in aggregate reverse-link power will therefore depend on the RF conditions. If the rate of decrease is relatively fast, the aggregate reverse-link power may drop below the threshold level relatively quickly. Conversely, if the rate of decrease is relatively slow, the aggregate reverse-link power may take longer to drop below the threshold level. If the time offset of the given sector's noise-indication message broadcast could be adjusted based on the rate of decrease, the given sector could be responsive to the dynamic RF conditions. However, the conventional application of statically-configured time offsets does not allow for such dynamically responsive operation. Accordingly, embodiments of the present invention advantageously provide dynamic setting of the time offset for broadcasts of reverse-link noise-indication messages based on RF conditions.

Hence in one respect, various embodiments of the present invention provide, in a device configured to control a plurality of wireless coverage areas of a wireless communication system, the plurality including at least a first wireless coverage area and a second wireless coverage area, a method comprising: at the device, determining that the first wireless coverage area has transmitted a first noise-indication message configured to instruct a first group of access terminals to reduce their respective contributions to a first aggregate reverse-link noise power detected by the first wireless coverage area; at the device, determining a rate of reduction of a second aggregate reverse-link noise power detected by the second wireless coverage area from a second group of access terminals after the first wireless coverage area has transmitted the first noise-indication message; and at the device, based at least on the determined rate of reduction, dynamically setting a relative time offset from transmission of the first noise-indication message from the first wireless coverage area to a subsequent transmission time for a second transmission of a second noise-indication message from the second wireless coverage area, whereby the second wireless coverage area will be caused to transmit the second noise-indication message at the subsequent transmission time.

In another respect, various embodiments of the present invention provide a device configured to control a plurality of wireless coverage areas of a wireless communication system, wherein the plurality includes at least a first wireless coverage area and a second wireless coverage area, the device comprising: means for determining that the first wireless coverage area has transmitted a first noise-indication message configured to instruct a first group of access terminals to reduce their respective contributions to a first aggregate reverse-link noise power detected by the first wireless coverage area; means for determining a rate of reduction of a second aggregate reverse-link noise power detected by the second wireless coverage area from a second group of access terminals after the first wireless coverage area has transmitted the first noise-indication message; and means for, based at least on the determined rate of reduction, dynamically setting a relative time offset from transmission of the first noise-indication message from the first wireless coverage area to a subsequent transmission time for a second transmission of a second noise-indication message from the second wireless coverage area, whereby the second wireless coverage area will be caused to transmit the second noise-indication message at the subsequent transmission time.

In yet another respect, various embodiments of the present invention provide a non-transient computer-readable medium having stored thereon computer-executable instructions that, if executed by a processor of a device configured to control a plurality of wireless coverage areas of a wireless communication system, wherein the plurality includes at least a first wireless coverage area and a second wireless coverage area, cause the device to perform functions comprising: determining a rate of reduction of a second aggregate reverse-link noise power detected by the second wireless coverage area from a second group of access terminals after the first wireless coverage area has transmitted the first noise-indication message; and based at least on the determined rate of reduction, dynamically setting a relative time offset from transmission of the first noise-indication message from the first wireless coverage area to a subsequent transmission time for a second transmission of a second noise-indication message from the second wireless coverage area, whereby the second wireless coverage area will be caused to transmit the second noise-indication message at the subsequent transmission time.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
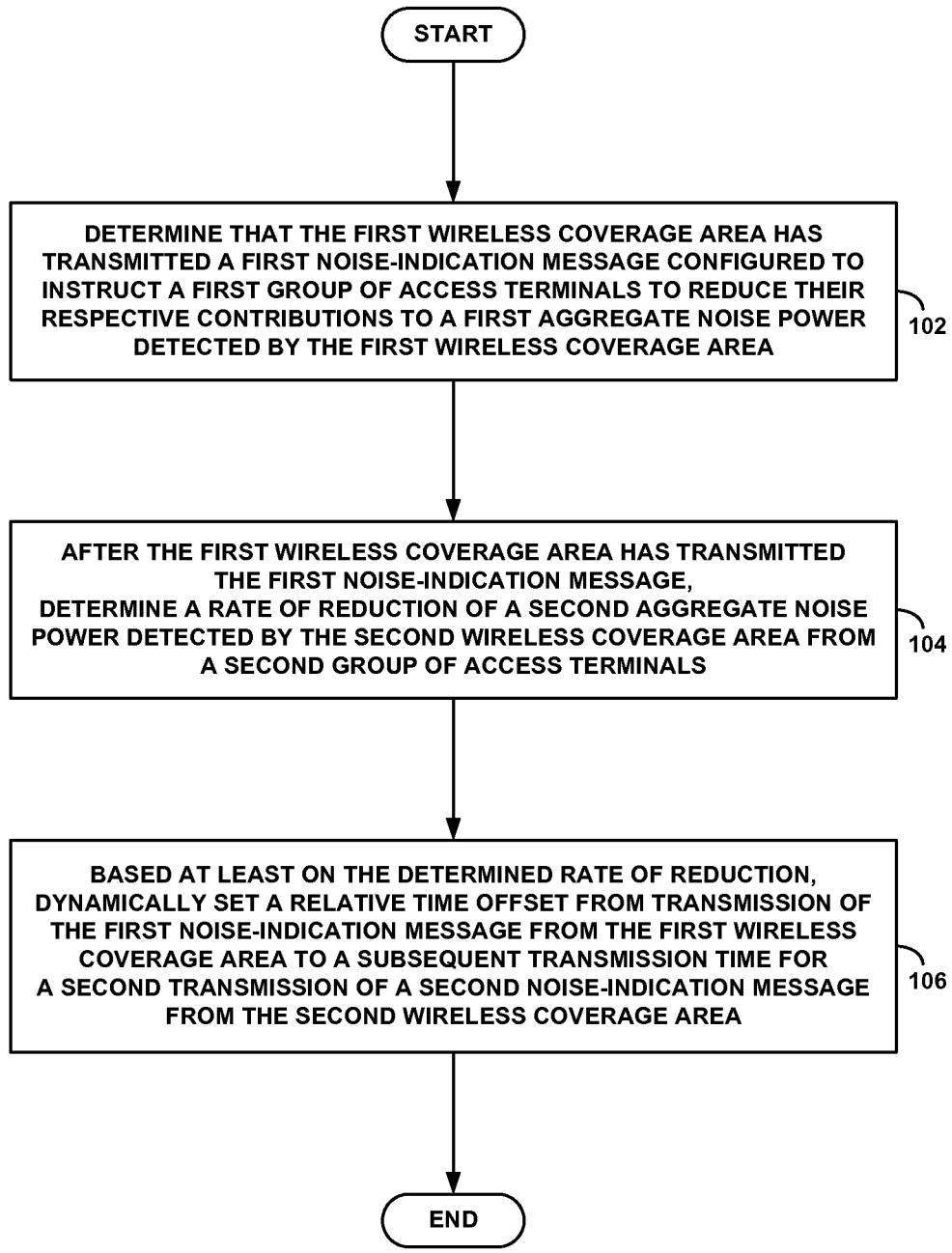
FIG. 1 is a flowchart illustrating an example embodiment of dynamic reverse activity bit offset adjustment based on RF conditions.

FIG. 1 is a flowchart illustrating an example embodiment of dynamic reverse activity bit offset adjustment based on RF conditions. By way of example, the steps of the flowchart could be implemented in a device, such as a base station or base station controller, that is part of a wireless communication system, and that is configured to control a plurality of wireless coverage areas, examples of which include cells, sectors, or the like. The plurality of wireless coverage areas is taken to include at least a first wireless coverage area and a second wireless coverage area. In accordance with the example embodiment, the wireless communication system, including the base station, cells, sectors, etc., is configured to operate according to a CDMA family of protocol, including at least IS-856. For the purposes of the present discussion, a sector will be taken as a representative example of a wireless coverage area, and the two will generally be referred to interchangeably, with the understanding that the embodiments disclosed herein are not limited to only this form of wireless coverage area, and that others (e.g., cells) could be used.

At step 102, the control device determines that the first wireless coverage area has transmitted a first noise-indication message configured to instruct a first group of access terminals to reduce their respective contributions to a first aggregate reverse-link noise power detected by the first wireless coverage area. As described below, each AT with an active communication session in a sector transmits on a respective reverse link to the sector. The combined reverse-link transmission power of all ATs in a sector is detected by the sector as an aggregate power, and may be considered an aggregate reverse-link noise power with respect to the sector's ability to detect and decode individual signals. Under IS-856, a sector informs the ATs of the aggregate reverse noise conditions by periodically broadcasting a noise-indication message. When the detected aggregate reverse noise power is above a threshold level, the noise-indication message comprises an instruction to the ATs to reduce their respective contributions to the aggregate reverse noise power, so as to help bring it back down below the threshold level.

The first group of access terminals comprises those with active communication sessions in the first wireless coverage area, and the first wireless coverage area (e.g., a first sector) may therefore transmit the first noise-indication message in response to detecting aggregate reverse noise above a threshold level. In accordance with the example embodiment, at step 102 the control device makes a determination that the first noise-indication message has been transmitted. For instance, the first wireless coverage area could communicate the contents of each transmitted noise-indication message to the control device, whereby the determination could correspond to receipt of the communicated particular contents of the first noise-indication message that had been transmitted to the first group of access terminals.

At step 104, the control device determines a rate of reduction of a second aggregate reverse-link noise power detected by the second wireless coverage area from a second group of access terminals after the first wireless coverage area has transmitted the first noise-indication message. The second group of access terminal comprises ATs with active communication sessions in the second wireless coverage area, including one or more that also has an active communication session in the first wireless coverage area. To the extent that the first and second groups overlap, the reduced contribution from the first group of access terminals to the first aggregate reverse noise power in response to the first noise-indication message will also yield a reduced contribution from the second group of access terminals to the second aggregate reverse noise power. The rate of reduction of the second aggregate reverse noise power detected after the first wireless coverage area has transmitted the first noise-indication message is the determination made at step 104 by the control device. The second wireless coverage area could communicate the reduction rate to the control device, whereby the determination could correspond to receipt of the communicated reduction rate.

Finally, at step 106, the control device uses the determined rate of reduction as a basis to dynamically set a relative time offset from transmission of the first noise-indication message from the first wireless coverage area to a subsequent transmission time for a second transmission of a second noise-indication message from the second wireless coverage area. The second wireless coverage area will thereby be caused to transmit the second noise-indication message at the subsequent transmission time. By basing the time offset on the determined reduction rate, the control device advantageously helps ensure that the second wireless coverage area will wait long enough to derive an optimum benefit from the aggregate reverse noise reduction initiated by transmission of the first noise-indication message.

More particularly, if the second aggregate reverse noise power is detected above a threshold level by the second wireless coverage area at the time of transmission of the first noise-indication message, the second wireless coverage area can transmit a second noise-indication message configured to instruct the second group of access terminals to reduce their respective contributions to the aggregate reverse-link noise power. As described below in further detail, the time offset between transmissions of the first noise-indication message from the first wireless coverage area and the second noise-indication message from the second wireless coverage area allows the second wireless coverage area to observe the effect of the first noise-indication message on reducing the second aggregate reverse-link noise power before setting the contents of the second noise-indication message. If the reduction over the interval of the time offset is sufficient to bring the second aggregate reverse-link noise power below the threshold, the second wireless coverage area can transmit a second noise-indication message that is instead configured to instruct the second group of access terminals to increase the power of their respective reverse-link transmissions.

As noted above, the first group of access terminals includes at least one access terminal that is also included in the second group of access terminals. In particular, the first group of access terminals may comprise ATs in soft handoff service within the first wireless coverage area, and the second group of access terminals may comprise ATs in soft handoff service within the second wireless. As such, one or more of the ATs that are in both groups would also be in soft handoff with both wireless coverage areas. Alternatively or additionally, one or more of the ATs that are in both groups might be in soft handoff only in the first wireless coverage area, yet still contributing to the second aggregate reverse noise power detected by the second wireless coverage area.

In accordance with the example embodiment, the rate of reduction of the second aggregate reverse-link noise power will be determined by making a first determination of the second aggregate reverse-link noise power detected by the second wireless coverage area, and then making a later, second determination of the second aggregate reverse-link noise power detected by the second wireless coverage area. The rate of reduction can thereby be computed as a rate of decrease in the second aggregate reverse-link noise power detected between the first and second determinations. For example, a simple linear rate of decrease can be determined as the difference between the first and second determinations divided by the time between the two determinations. It will be appreciated that other, more complicated functional representations of the rate of decrease are possible as well.

Furthermore, the rate of reduction of the second aggregate reverse-link noise power could be determined by the second wireless coverage area, and then communicated in an appropriate message to the control device. Alternatively, the second wireless coverage area could communicate the first and second determinations of aggregate reverse noise power, as well as the time between the two determinations. The control device could then calculate (or otherwise determine) the reduction rate.

In further accordance with the example embodiment, the control device is a BSC or an RNC and is configured to operate according to a CDMA family of protocols, including at least IS-856, and each wireless coverage area comprises is a cell or sector. The first noise-indication message in the example embodiment then corresponds to a first reverse activity bit (RAB) set and broadcast by the first cell or sector in response to detection of the first aggregate reverse noise power above a threshold level. As described below, a given sector sets the RAB to one of two (binary) values depending on whether the given sector measures aggregate reverse-link noise to be above or below a threshold level. The RAB is then broadcast (transmitted) on the Reverse Activity Sub-Channel of the given sector's forward link to all access terminals being served by the given sector.

The first aggregate reverse-link noise power in the example embodiment thus corresponds to a first detected reverse-noise rise (RNR) measured by the first sector, and the first sector thus responds to detection of the first RNR above a threshold RNR by broadcasting a RAB set accordingly. Likewise, the second aggregate reverse-link noise power corresponds to a second detected RNR measured by the second sector, and the rate of reduction of the second aggregate reverse-link noise power corresponds to a rate of decrease of the second RNR. The second noise-indication message then corresponds to a second RAB set and broadcast by the second cell or sector in response to detection of the second RNR.

In practice, each sector sets and broadcasts the RAB periodically, typically with rate of at least once per frame, wherein the start of each of continually-repeating frames is synchronized across all sectors (and/or cells) of a wireless communication system. Each frame is further subdivided into time slots, wherein the transmission of any given RAB spans at least one time slot and its transmission time is measured from the start of the frame as "RAB offset" in units of time slots.

Access terminals engaging in active IS-856 sessions via their respective serving sectors respond to each RAB broadcast from their serving sectors in such a way that tends to decrease RNR if the RAB corresponds to an RNR that exceeds the threshold, and increase RNR if the RAB corresponds to an RNR that does not exceed the threshold. Correspondingly, aggregate (as well as per-AT) reverse-link noise and aggregate (as well as per-AT) reverse-link data rates will tend to decrease and increase with aggregate (as well as per-AT) reverse-link power. An active terminal in soft handoff will receive a periodic RAB broadcast from each sector in its active set, and will respond to each, giving priority to RABs that correspond to aggregate reverse-link noise in excess of the threshold. Consequently, the response of the AT to a RAB from one active-set sector will impact the aggregate reverse-link noise in each of the AT's active set sectors.

While the start times of frame transmissions are synchronized across sectors, RAB broadcasts of geographically nearby or adjacent sectors are not. More specifically, relative RAB offsets can be introduced between the RAB broadcasts of adjacent sectors in order to avoid synchronous up-and-down settings of RABs sometimes referred to as "ping-ponging." By placing a RAB offset between two adjacent sectors' RAB broadcasts, the later-broadcasting sector can observe the effect on RNR of the earlier-broadcasting sector's RAB. In conventional operation under IS-856, RAB offsets are statically configured. Consequently, dynamic conditions, and in particular the rate of change of RNR in one sector that results from a RAB broadcast by an adjacent sector, cannot be accounted for in the RAB offset. However, in accordance with the example embodiment, the rate of decrease of the second RNR is used as a basis to dynamically adjust the relative RAB offset between the first and second sectors of the example embodiment. The time offset discussed above thus corresponds to this relative RAB offset, also measured in units of time slots. It will be appreciated that a relative RAB offset between RAB broadcasts of any two sectors can be represented arithmetically as two different RAB offsets reference to the start of a frame.

The control device (e.g., BSC, RNC, or the like) uses the rate of decrease of the second RNR as a basis for dynamically setting the relative offset by computing an amount of time required for the second RNR detected by the second sector to decrease below the RNR threshold level, and then setting the relative RAB offset to at least the computed amount of time. The dynamically-set RAB offset is then reported to and used by the second sector. By dynamically adjusting the RAB offsets in this manner, the control device helps ensure that the second sector has sufficient time to observe the effects of the first RAB broadcast before evaluating the second RNR and setting the second RAB. If second RNR is thereby detected below the threshold, the second sector can forgo broadcasting a RAB that would have tended to reduce the reverse-link data rates of the second group of access terminals.

Since RAB broadcasts in each sector are periodic with a rate of at least once per frame and with a per-sector RAB offset measured from start of system-synchronous frames, each AT needs to know the RAB offset for each sector in its active set in order to be able to properly detect RAB broadcasts from its active-set sectors. In accordance with the example embodiment, the control device (BSC or RNC) will cause the second sector to transmit an update message including an indication of the dynamically-adjusted RAB offset to all access terminals being served by the second sector (e.g., the second group of access terminals).

In the discussion of FIG. 1, as well as in other discussions and explanations herein, the terms "first" and "second" as applied to "wireless coverage areas," "sectors," "groups of access terminals," "noise-indication messages," etc., are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention and embodiments thereof.

Figure 2:
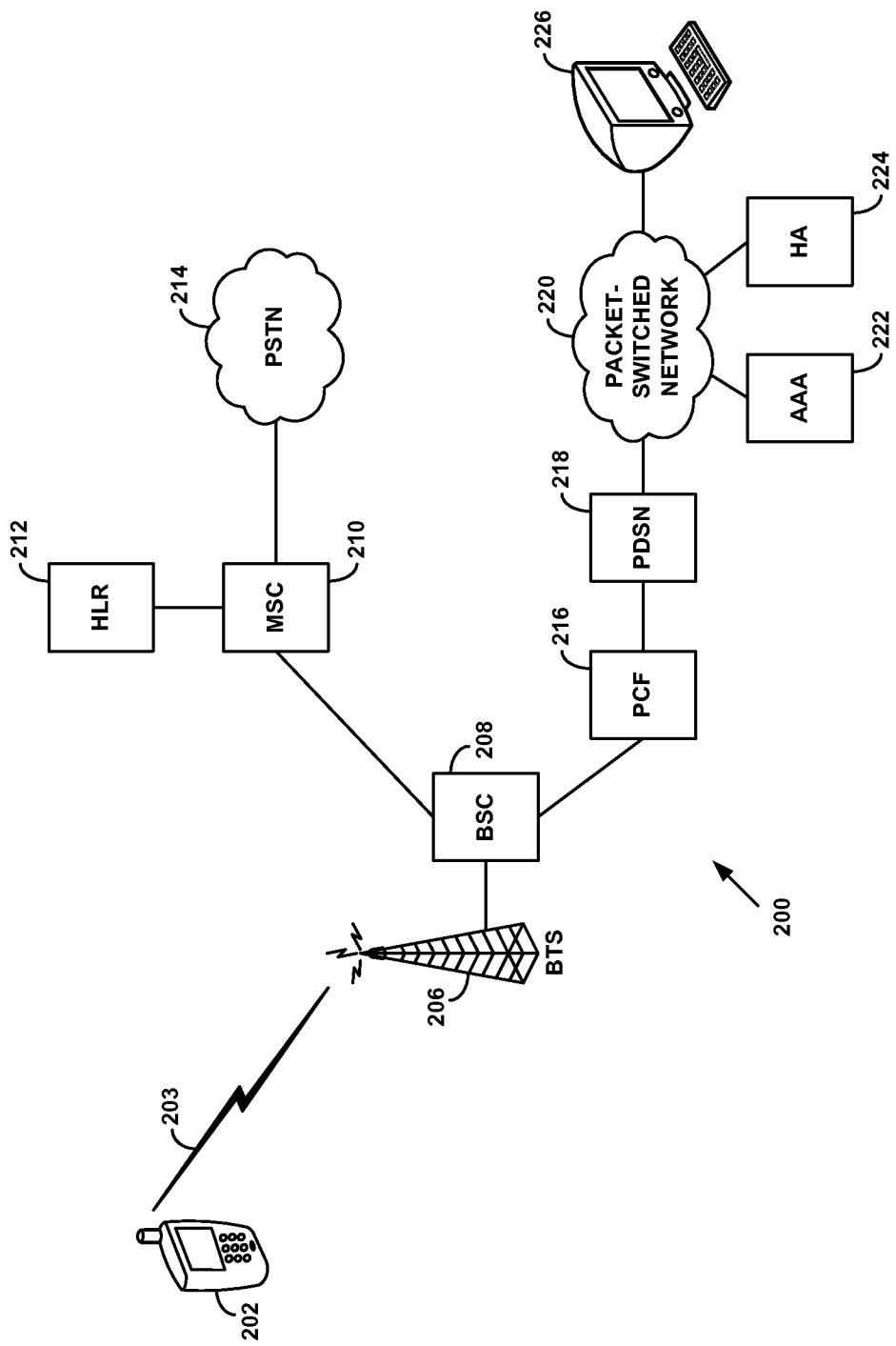
FIG. 2 is a simplified block diagram of a wireless communication system in which an example embodiment of dynamic reverse activity bit offset adjustment based on RF conditions can be employed.

FIG. 2 shows a simplified block diagram of a wireless communication system 200 in which an example embodiment of dynamic reverse activity bit offset adjustment based on RF conditions can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link").

The BSC 208 is connected to an MSC 210, which acts to control assignment of air traffic channels (e.g., over air interface 303), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 222, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention or embodiments thereof. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer hardware, firmware, or software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, system 200, AT 202, and air interface 203 collectively are representative of example means of implementing and carrying out the various functions, steps, and procedures described herein.

Figure 3:
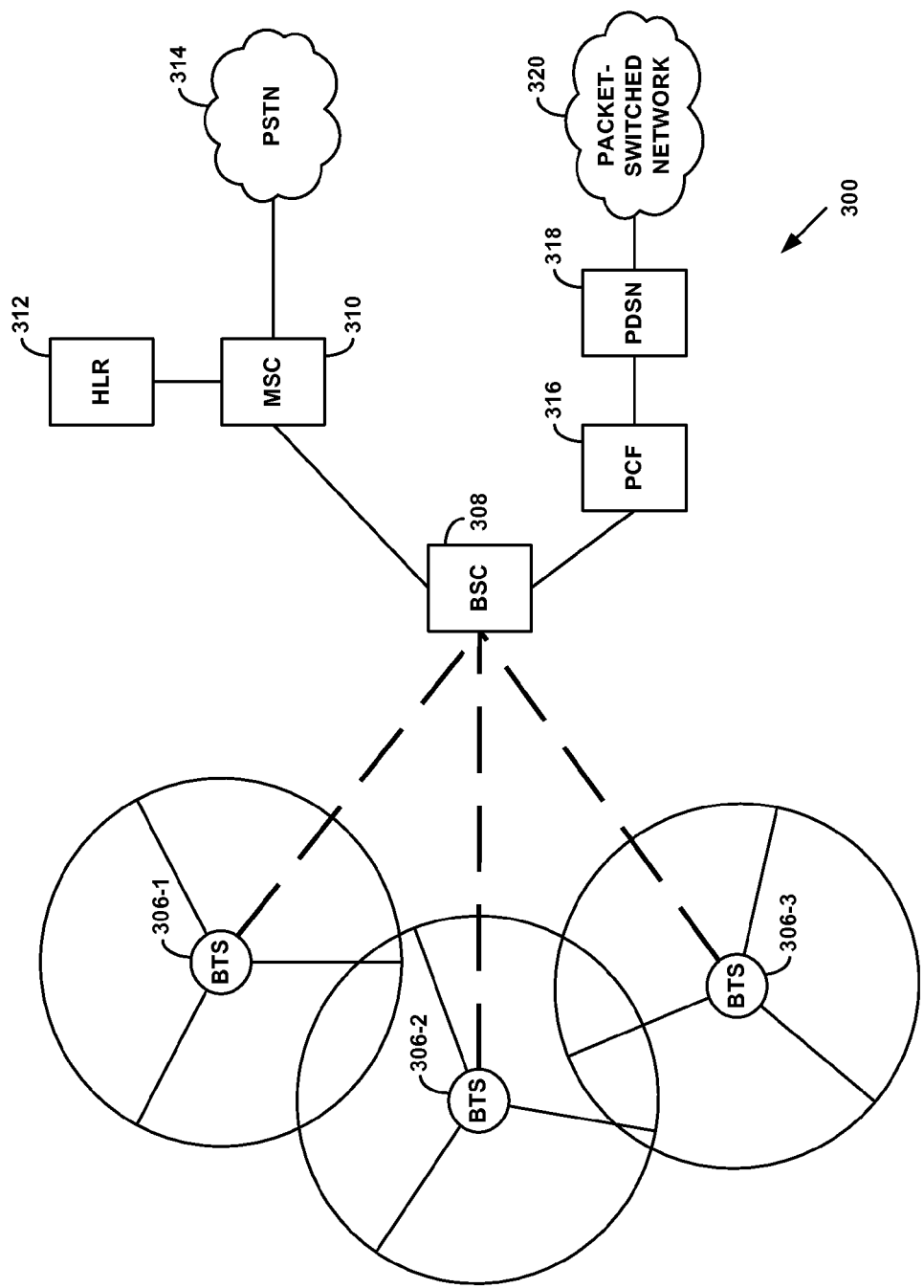
FIG. 3 is a simplified block diagram illustrating an example configuration of physical sectors in a wireless communication system in which an example embodiment of dynamic reverse activity bit offset adjustment based on RF conditions can be employed.

In practice, a BSC may serve multiple BTSs, each of which may then radiate to define a given cell and a plurality of cell sectors. This arrangement is illustrated by way of example in FIG. 3, which shows BSC 308 in network 300 coupled with three BTSs 306-1, 306-2, and 306-3. Each BTS is shown at the core of a respective circle representing a cell, and each cell is divided into three pie-pieces representing wireless service sectors. With this arrangement, an access terminal can operate in any of the sectors and can connect, via a serving BTS, with MSC 310 for circuit-based services in the wireless communication system and beyond (e.g., in PSTN 314). Through its serving sector, an access terminal can also communicate, via PCF 316 and PDSN 318, on packet network 320. Note that the depiction of three wireless services sectors for each of the BTSs in FIG. 3 is shown by way of example, and other numbers of sectors per BTS are possible. Further, the relative positions of the BTSs and the relative angular orientations of the wireless service sectors are also illustrative, and other arrangements may be used.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CONVENTIONAL CDMA COMMUNICATIONS

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's active set. Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. HIGH RATE PACKET-DATA COMMUNICATIONS

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Power control of the reverse link under IS-856 employs one or more feedback procedures by which an AT adjusts its reverse-link power and data rates in response to commands from the AT's serving sector that are aimed at maintaining a particular AT-specific reverse-link error rate within an AT-specific threshold error rate, or at maintaining an aggregate reverse-link noise level below a threshold noise level. In particular, each sector periodically broadcasts a RAB on its Reverse Activity sub-channel, wherein the value of the RAB depends on the aggregate reverse-link noise measured by sector. An AT responds to each RAB received from each of its active-set sectors by adjusting the transmission power and/or transmission rates of its reverse data channel according to procedures compliant with one or another of Rel. 0 and Rev. A versions. In particular, the AT adjusts its data channel transmission power and transmission rate relative to its pilot power level based on the RAB received from the sector and on the particular protocol version.

More specifically, the sector continually measures an aggregate of reverse link transmission power and every 1.67 ms (i.e., every time slot) computes a noise metric referred to as reverse noise rise (RNR). RNR is the difference between (i) the reverse noise that the access node is currently detecting and (ii) a baseline level of reverse noise. Thus, the sector computes how far the reverse noise has risen above that baseline. When the computed RNR exceeds a threshold RNR value, the sector sets the RAB to one; when the computed RNR does not exceed the threshold RNR value, the sector sets the RAB to zero.

The RNR is typically expressed as a gain level, x, with respect to the baseline level according to the relation xdB=10 $\log_{10}(P_{noise}/P_{baseline})$, where $P_{noise}$ and $P_{baseline}$ are power in mW (milliwatts). For example, x=+3 dB would correspond to a threshold power twice that of the baseline power. Similarly, the threshold RNR can be expressed as a relative gain with respect to the baseline power, so that RNR can also be expressed as a relative gain with respect to the threshold RNR. For instance, an RNR that is +3 dB over the threshold RNR would correspond to RNR at twice the power of the threshold RNR.

The RNR threshold is a configurable system parameter that can range from 0 dB to 30 dB, with a typical value being 5 dB. Hence, a RAB set to one corresponds to higher reverse-link noise (and less favorable RF conditions), while a RAB set to zero corresponds to lower reverse-link noise (and more favorable RF conditions).

The sector periodically broadcasts the RAB to served access terminals on its Reverse Activity sub-channel at a rate typically in multiples of once per frame up to a maximum of 16 times per frame, corresponding to once per time slot. Each broadcast is sustained over an integer number of consecutive time slots of a frame. The integer number is set in a parameter conventionally referred to as "RABlength." An AT with an active EVDO data session will, in turn, adjust its data channel power level and transmission rate according to the received RAB.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probabilistic test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition. When the RAB of any one of the AT's active-set sectors is one, the AT treats the RAB of all of its active-set sectors as being set to one.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Under IS-856, Rev. A, an AT sets its reverse-link data channel transmission power according to a ratio of reverse traffic channel power to revere pilot channel power, referred to as "T2P." More specifically, the AT tracks a short-term and a long-term historical indicator of RAB values reported by the base station in order to dynamically adapt T2P for more rapid changes in data rate. Briefly, Rev. A reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket added to the bucket and an amount "T2POutflow" the AT uses from the bucket. The AT determines T2PInflow as a function of the short-term RAB indicator, referred to as "QRAB," the long-term RAB indicator, referred to as "FRAB," and the pilot strength of the forward link from the base station (i.e., BTS in the cell or sector).

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. Also, since the frame size is generally fixed, packet size corresponds to a data density and therefore a data rate; i.e., a larger packet size corresponds to a higher data rate, and vice versa. Under IS-856, Rev. A, effective reverse-link data rates can range from 19.2 kbps up to 1.84 megabits per second (Mbps).

Operation in an IS-856 compliant communication system may be illustrated, again with reference to FIG. 2. To acquire packet data connectivity under IS-856, after an access terminal first detects an EVDO carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

3. DYNAMIC ADJUSTMENT OF REVERSE ACTIVITY BIT OFFSET a. Operating Principles Under both IS-856, Rel. 0 and IS-856, Rev. A, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise from all ATs served by the base station. In other words, reverse power-control procedures comprise a feedback mechanism, with the RAB acting as a feedback variable.

As described above, the response of a given AT under either protocol version to a RAB from a given sector will not necessarily yield an immediate decrease or increase in the AT's reverse traffic channel power level. However, the response of the given AT will not be the opposite of that intended by the RAB, and the aggregate of the average response of all active ATs in the given sector will be in accordance with that intended by the RAB. That is, a RAB of one will result in net decrease in reverse-link noise in the given sector, while a RAB of zero will result in a net increase in reverse-link noise in the sector.

Also as described above, the aggregate reverse-link noise in a given sector can include contributions from access terminals in nearby or neighboring sectors. This is particularly the case when some of the ATs with active EVDO sessions in the given sector are in soft handoff in both that sector and in one or more nearby or neighboring sectors. Since each AT in soft handoff in the given sector will respond to RAB broadcasts from all of its respective active-set sectors, the aggregate response in the given sector and in one or more of the nearby sectors serving common ATs in soft handoff can result in a ping-ponging of RNR. This will cause the given sector and one or more neighboring sectors to broadcast alternating RAB values, which in turn will tend to cause ATs to ping-pong their reverse traffic channel power levels. The net impact can be reduced efficiency and degradation of service quality. Introduction of different RAB offsets for different sectors located nearby one another can help mitigate this problem, but as implemented conventionally, RAB offsets cannot account for dynamic changes in RF conditions. Accordingly, example embodiments disclosed herein provide for dynamic reverse activity bit offset adjustment based on RF conditions.

b. Example Operation

Figure 4:
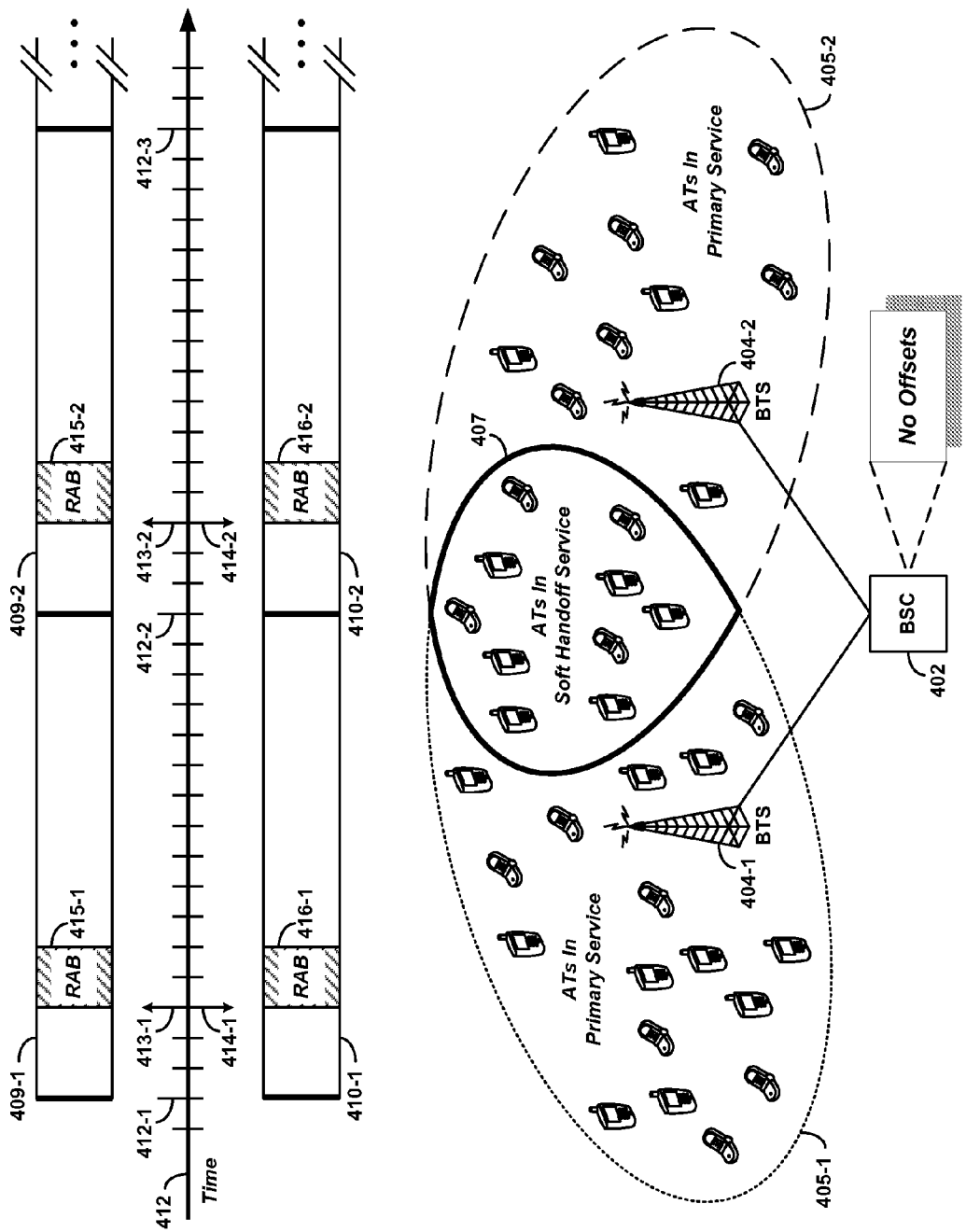
FIG. 4 illustrates conventional, simultaneous broadcast of reverse activity bits by two adjacent wireless coverage areas under the control of a common BSC, for an example distribution of access terminals among the two wireless coverage areas.

FIG. 4 illustrates conventional, simultaneous broadcast of reverse activity bits by two adjacent wireless coverage areas under the control of a common BSC, for an example distribution of access terminals among the two wireless coverage areas. The bottom portion of the figure shows a BSC 402 that controls two BTSs 404-1 and 404-2, which in turn provide two wireless coverage areas 405-1 (short-dashed oval) and 405-2 (long-dashed oval), respectively. For purposes of illustration, the two wireless coverage areas are depicted as resembling cells more than sectors, so wireless coverage areas will be take to be cells in the present discussion. However, the present discussion applies to sectors or other similar forms of wireless coverage area as well. By way of example, the cells 405-1 and 405-2 provide overlapping coverage, depicted as the region 407 (drawn in a thick black line). The term "overlapping coverage" is used here to mean that an AT in the overlapping region 407 could detect a sufficiently strong signal from each of BTS 404-1 and 404-2 to acquire service from each of them (i.e., to be able to be in soft handoff service in both cells 405-1 and 405-2).

Also by way of example, there are 27 total access terminals shown to be in service in cell 405-1, including 17 in primary service and 10 in soft handoff service in the overlap region 407. In cell 405-2 there are 20 total access terminals shown to be in service, including 10 in primary service and 10 in soft handoff service in the overlap region 407. The 10 access terminals in soft handoff in cell 405-1 are the same 10 that are in soft handoff in cell 405-2. That is, each of the 10 access terminals is in soft handoff with both of cells 405-1 and 405-2. Accordingly, each of these 10 access terminals includes both cells 405-1 and 405-2 in its active set. Note that the consideration of only two classifications of ATs—i.e., ones in primary service and ones in soft handoff service in the overlap region 407—is for purposes of illustration. The intent is to identify in each cell (1) a total number of ATs and (2) a number of ATs in common soft handoff service concurrently in both cells. In particular, there could be other ATs in soft handoff service in either of the two cells that are not in common soft handoff service in the two cells (i.e., not in overlap region 407). Such ATs would just be considered among the total number in their respective cell. However, there is no loss of generality by considering only two classifications illustrated in FIG. 4.

The top portion of FIG. 4 shows a representation of RAB broadcasts from each of cells 405-1 and 405-2 over the course of two consecutive frames 409-1, 409-1 from cell 405-1, and two consecutive frames 410-1, 410-1 from cell 405-2 (a third frame from each cell is shown with hatch marks and ellipses to indicate further, ongoing transmissions). A timeline 412 is displayed between the frames 409 and the frames 410; each tick mark on the timeline represents one time slot (although other time units could be used). As illustrated, the start times of frames 409-1 and 410-1 are synchronized at time 412-1; similarly, the start times of frames 409-1 and 410-1 are synchronized at time 412-1 (and the next frame from each cell starts at time 412-3). A thick dark line demarks the boundary between frames.

The RAB broadcast from each cell is represented by a single hatched box labeled "RAB" in each frame. For purposes of the present illustration, each RAB is shown to last two time slots (i.e., RABlength=2), and is broadcast only once per frame. Both the duration (RABlength value) and the period could be different, but would not alter the current discussion with respect to relative RAB offsets between two or more cells (or sectors).

Since there is no relative RAB offset between the RAB broadcasts from the two cells 405-1 and 405-2, the RAB broadcasts from both cells start at the same time slot. The RAB broadcast 415-1 from cell 405-1 begins at time 413-1, which by way of example corresponds to the fourth time slot of frame 409-1. Similarly, the RAB broadcast 416-1 from cell 405-2 begins at time 414-1, which is the same as time 413-1 and thus also corresponds to the fourth time slot of frame 410-1. In the next frame, the RAB broadcast 415-2 from cell 405-1 begins at time 413-2, which corresponds to the fourth time slot of frame 409-2. And similarly, the RAB broadcast 416-2 from cell 405-2 begins at time 414-2, which is the same as time 413-2 and thus also corresponds to the fourth time slot of frame 410-2.

In this conventional mode of operation, the absence of a time offset between the RAB broadcasts from the two cells will cause all of the ATs in both cells to respond in near synchronicity to the respective RABs. As noted above, a possible result of such synchronous RAB broadcasts and corresponding synchronous AT responses is alternating increases and decreases of aggregate reverse-link power in one or both cells. An ancillary effect of such alternations would be alternating increases and decreases of aggregate (as well as per-AT) reverse-link data rates. The overall impact could thus be reduced efficiency and service degradation.

Figure 5:
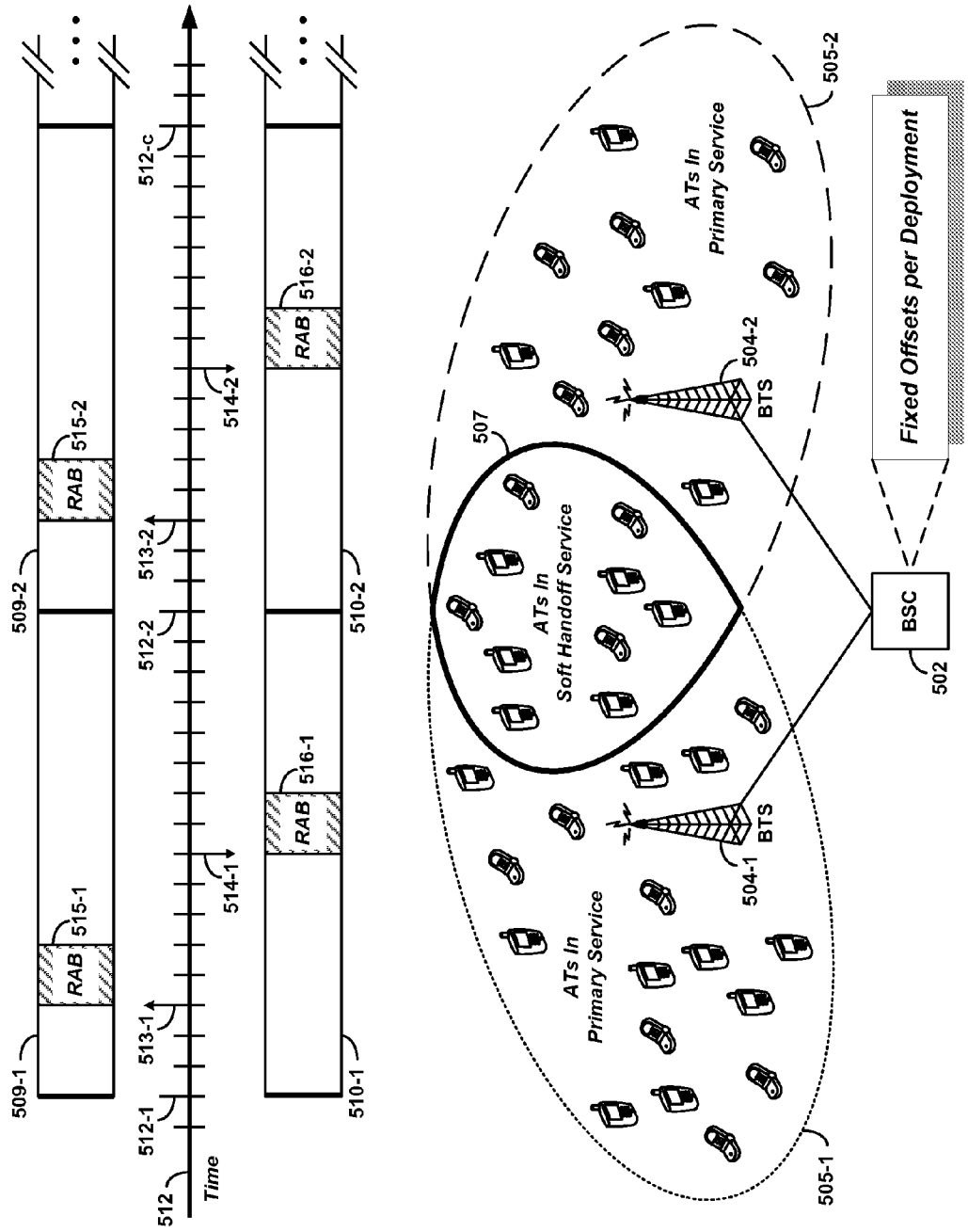
FIG. 5 illustrates conventional, time-offset broadcast of reverse activity bits by two adjacent wireless coverage areas under the control of a common BSC, for an example distribution of access terminals among the two wireless coverage areas.

In order to help mitigate the effects of synchronous RAB broadcasts of the type illustrated in FIG. 4, a RAB offset can be introduced between RAB broadcasts from neighboring cells (or sectors). The conventional way of doing this is to statically configure RAB offsets between sectors that are located next to or nearby one another. FIG. 5 illustrates this conventional approach for the same example configuration of BSC, BTSs, cells, and distribution of ATs as shown in FIG. 4. Except for beginning with a "5" instead of a "4," each item label in FIG. 5 corresponds to a like item label in FIG. 4 and identifies an identical network component or conceptual element (e.g., timeline, frame, etc.).

FIG. 5 differs from FIG. 4 in the relative time offset between RAB broadcasts from each of the cells 505-1 and 505-2. Specifically, as in FIG. 4, the respective start times 513-1 and 513-2 of RAB broadcasts 515-1 and 515-2 from cell 505-1 correspond to the fourth time slot in frames 509-1 and 509-2, respectively. However, the respective start times 514-1 and 514-2 of RAB broadcasts 516-1 and 516-2 from cell 505-2 correspond to the ninth time slot in frames 510-1 and 510-2, respectively. In other words, there is a relative RAB offset between RAB broadcasts from cell 505-1 and 505-2 of five time slots. The particular value of five time slots is chosen by way of example for the purposes of illustration. Other values could be used as well.

During the intervening five time slots in each frame, BTS 504-2 can evaluate the effect on RNR in cell 505-2 of the RAB broadcasts from cell 505-1. In particular, BTS 504-2 may determine that the RNR in cell 505-2 changed sufficiently during the five intervening time slots so as to warrant a change in the RAB that BTS 504-2 would have broadcast at the earlier broadcast time used by cell 505-1. If so, ping-ponging of RAB (and RNR) due to simultaneous RAB broadcasts may be avoided, or at least reduced.

However, although it is not explicitly evident from the form of the depiction in FIG. 5, the (example) five-slot offset is statically configured in conventional operation. That is, for this example of conventional operation, the RAB broadcasts from cell 505-2 always occur five time slots after RAB broadcasts from cell 505-1, at least until the statically configured offset is possibly changed (e.g., by the network operator). In particular, this offset will be used regardless of whether or not it allows sufficient time for cell 505-2 to observe an advantageous change in RNR before setting and broadcasting its own RABs (e.g. RAB 516-1 and/or 516-2). For example, if at time 513-1 BTS 504-2 detects RNR above the threshold level and also observes a decreasing rate of RNR initiated by RAB 515-1 broadcast by BTS 504-1, the statically-configured five time slots it waits until broadcasting its RAB 516-1 may or may not be sufficient for the RNR to drop below the threshold level. On the other hand, if the offset between RAB broadcasts from the two BTSs could be dynamically adjusted based on the rate of decrease of RNR, BTS 504-2 could be more reliably assured of measuring RNR below the threshold level by the time it broadcasts its RAB.

Figure 6:
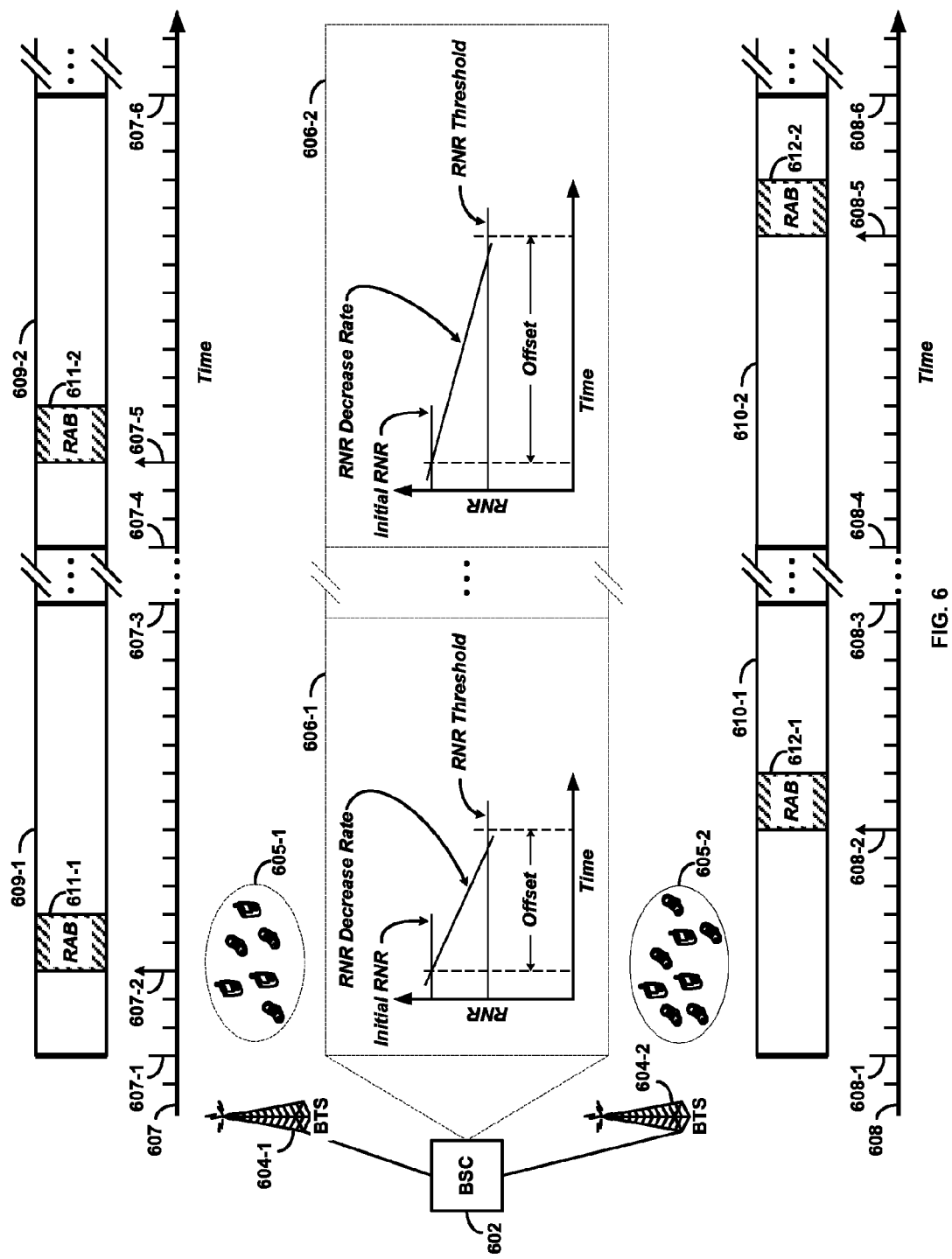
FIG. 6 illustrates broadcast of reverse activity bits by two nearby wireless coverage areas under the control of a common BSC that employs an embodiment of dynamic reverse activity bit offset adjustment based RF conditions, for an example distribution of access terminals among the two wireless coverage areas.

FIG. 6 illustrates example operation of the example embodiment in which a BSC 602 dynamically determines RAB offsets based on the rate of decrease of RNR measured by the sectors under its control. By way of example, BSC 602 is shown to control BTS 604-1 and BTS 604-2. Also by way of example, BTS 604-1 is shown to control a sector 605-1 (represented as a dashed oval enclosing a first group of access terminals), and BTS 604-2 is shown to control a sector 605-2 (represented as a dashed oval enclosing a second group of access terminals). It will be appreciated that each of these BTSs could radiate multiple (e.g., three) sectors; for the purposes of the present discussion, however, both are represented with just one sector (or cell).

Continuing with the description of FIG. 6, a timeline 607 is shown for frame transmissions and RAB broadcasts from BTS 604-1, and a timeline 608 is similarly shown for frame transmissions and RAB broadcasts from BTS 604-2. More particularly, at time 607-1 and extending until time 607-3, BTS 604-1 transmits a frame 609-1; then at time 607-4 and extending until time 607-6, BTS 604-1 transmits a frame 609-2. In the present example operation, the two frame transmissions 609-1 and 609-2 are not necessarily consecutive, as indicated by the hatched lines and ellipses between the two frames. Similarly, at time 608-1 and extending until time 608-3, BTS 604-8 transmits a frame 610-1; then at time 608-4 and extending until time 608-6, BTS 604-2 transmits a frame 610-2. The two frame transmissions 610-1 and 610-2 are also not necessarily consecutive, again as indicated by the hatched lines and ellipses between these two frames.

For purposes of illustrating example operation, time 607-1 and time 608-1 are the same, so that the start of frame 609-1 is synchronized with the start of frame 610-1, and the time slots of these two frames are also coincident in time. Similarly, time 607-2 and time 608-2 are the same, so that the start of frame 609-2 is synchronized with the start of frame 610-2, and the time slots of these other two frames are also coincident in time.

By way of example, it is assumed that at time 607-2, both BTS 604-1 and BTS 604-2 detect RNR above their respective threshold levels (typically, though not necessarily, the same threshold among different sectors in a wireless communication system). At this time 607-2, BTS 604-1 broadcasts RAB 611-1 to the ATs in sector 605-1; as can be seen, time 607-1 corresponds to the fourth time slot in frame 609-1. Because the detected RNR is above the threshold level, the RAB 611-1 is set to one, so that the ATs in sector 605-1 respond by reducing their respective contributions to the RNR detected by BTS 604-1. In accordance with the example embodiment, the ATs reduce reverse-link power according to procedures of IS-856, Rel. 0 and/or IS-856, Rev. A, as described above.

Also by way of example, it is assumed that at least some of the ATs in sector 605-1 also contribute to the RNR detected by BTS 604-2. For example, at least some of the ATs in sector 605-1 may be in soft handoff in that sector and in sector 605-2 as well. Additionally or alternatively, at least some of the ATs in sector 605-1 may be detectable in sector 605-2 owing to proximity to BTS 604-2, even if some of those ATs are not in soft handoff in sector 605-2. In any case, the decrease in RNR in sector 605-1 initiated by RAB 611-1 will tend to also lead to a decrease in RNR in sector 605-2. In accordance with the example embodiment, the BSC 602 will determine the rate of decrease of RNR in sector 605-2 and use the rate of decrease as a basis for setting the RAB offset in sector 605-2.

The BSC's setting of the RAB offset based on the rate of decrease of RNR is depicted conceptually in FIG. 6 within the dashed box 606-1, where the rate of decrease is represented as a function in a plot of RNR vs. time. In the plot, an initial time is marked by a vertical dashed line aligned with time 607-2. At this initial time, BTS 604-2 detects RNR at a level labeled "Initial RNR" and marked by a short horizontal line. As shown, the initial RNR is above the threshold level, which is labeled "RNR Threshold" and marked by a long horizontal line. The rate of decrease of RNR is shown as a negatively-sloped line labeled "RNR Decrease Rate" that passes through the intersection point of the initial time and the initial RNR, and continues downward with increasing time to a point where it intersects the RNR Threshold line.

The intersection of the RNR Decrease Rate line with the RNR Threshold line marks the time at which BTS 604-2 can be predicted to detect the RNR crossing below the RNR threshold. The first time slot at or beyond this threshold-crossing point therefore marks a RAB offset relative to the initial time that will help ensure that BTS 604-2 detects RNR below the threshold, and thereby enable BTS 604-2 to set its RAB to zero at that time slot. The identified time slot is marked by a vertical dashed line; the span between the initial time and the identified time slot is labeled "Offset" in the plot. In the example within dashed box 606-1, the identified time slot is aligned with time 608-2, and corresponds to the ninth time slot in frame 610-1.

In accordance with the example embodiment and with the example illustration within dashed box 606-1, the BSC 602 would thus set the RAB offset with respect to the start of frame 610-1 to 9, or, equivalently, to 5 if set relative to RAB 611-1 broadcast by BTS 604-1. Thus, as shown, BTS 604-2 would broadcast RAB 612-1 to the access terminals in sector 605-2 at the dynamically-set RAB offset. By setting the offset such that BTS 604-2 detects RNR below the threshold, the corresponding RAB can be set to zero instead of to one. Advantageously, the access terminals in sector 605-2 can thereby, on average, maintain or increase their respective reverse-link data rates.

Example operation is further illustrated within the dashed box 606-2, which depicts in a like conceptual manner the BSC's setting of the RAB offset based on the rate of decrease of RNR under RF conditions that prevail during synchronous frames 609-2 and 610-2. The explanation above of the plot within dashed box 606-1 applies to that within dashed box 606-2 as well, but, for purposes of illustration, the rate of decrease of RNR in the latter case is taken to be different.

More specifically, the initial time now aligns with time 607-5 of RAB broadcast 611-2 from BSC 604-1; this time also corresponds with the fourth time slot of the frame 609-2. The RNR Decrease Rate shown in dashed box 606-2 is smaller than the one shown in dashed box 606-1. Consequently, the predicted intersection of this RNR Decrease Rate line with the RNR Threshold line in this latter case (606-2) is further from the initial time than in the former case (606-1). The first time slot at or beyond this latter threshold-crossing point is aligned with time 608-5, and in this latter case corresponds to the $12^{th}$ time slot in frame 610-2.

In accordance with the example embodiment and with the example illustration within dashed box 606-2, the BSC 602 would thus set the RAB offset with respect to the start of frame 610-2 to 12, or, equivalently, to 8 if set relative to RAB 611-2 broadcast by BTS 604-1. Thus, as shown, BTS 604-2 would broadcast RAB 612-2 to the access terminals in sector 605-2 at this latter dynamically-set RAB offset. Again, by setting the offset such that BTS 604-2 detects RNR below the threshold, the corresponding RAB can be set to zero instead of to one. And again, the access terminals in sector 605-2 can advantageously thereby, on average, maintain or increase their respective reverse-link data rates.

The two illustrations above in dashed boxes 606-1 and 606-2 in FIG. 6 show how the BSC 602 can dynamically set the RAB offset based on the rate of decrease of RNR observed in one sector as a result of an earlier RAB broadcast in an adjacent or nearby sector. The conceptual illustrations of the example operation could be implemented algorithmically as a computer program or other form of executable logic stored on one or more tangible (or otherwise nontransitory) computer-readable medium and executed by one or more processors of a control device, such as a BSC or RNC.

In accordance with the example embodiment, determination of the rate of decrease of RNR at a give sector will be made by measuring the RNR at the given sector at each of a sequence of consecutive time slots, from a starting time slot to an ending time slot. The rate of decrease will then be calculated by subtracting the RNR at the ending time slot from the RNR at the starting time slot and dividing the difference by the time from the starting to an ending time slots. The rate of decrease can be alternatively expressed in decrease per time slot by dividing instead by the number of time slots from the starting time slot to the ending time slot.

The RAB offset will then be determined such that, given an "RNR excess" by which the detected RNR exceeds the RNR threshold, and given the determined rate of decrease of RNR, the total amount of decrease in RNR achieved after an interval equal to the offset is at least as large as the RNR excess. This formulation can be expressed algebraically as follows. Let $P_{PRNR}$ be the detected RNR and let $P_{RNR\_threshold}$ be the threshold RNR. The RNR excess can thus be expressed as $\Delta P_{RNR} = P_{RNR} - P_{RNR\_threhold}$. Taking $R_{RNR\_decrease}$ to be the rate of decrease of RNR, the minimum amount of time, $\Delta T_{min}$, required to achieve a decrease equal to RNR excess can be expressed as $\Delta T_{min} = \Delta P_{RNR}/R_{RNR\_decrease}$. The RAB offset is then determined as the smallest integer number of time slots at least as large as $\Delta T_{min}$.

As formulated above, $\Delta T_{min}$ is referenced to an initial time at which the detected RNR corresponds to the RNR excess $\Delta P_{RNR}$. Hence, $R_{RNR\_decrease}$ needs to be determined by or soon enough after this initial time in order to use the computed $\Delta T_{min}$ to effectively predict when RNR will decrease sufficiently to reduce the RNR excess to zero. In further accordance with the example embodiment, the determination of $R_{RNR\_decrease}$ can be based one or more measurements of RNR prior to the initial time at which the calculation of $\Delta T_{min}$ is carried out, or over a short observation interval following the initial time but still within a time to make the prediction useful. Both approaches can be understood by way of illustration and with reference again to FIG. 6.

Considering the process represented in dashed box 606-2, for example, the RNR Decrease Rate appears to have been determined by the initial time 607-5 in order to be applied to a predict when the detected RNR will cross below the RNR Threshold. In practice, the distribution of ATs among sectors 605-1 and 605-2 will generally change relatively slowly over the course of a few (e.g., approximately 5-10) sequential RAB broadcasts. Accordingly, a time-averaged trend of RNR decrease observed within roughly 10 time slots prior to the initial time can be a good approximation of the expected rate of decrease at and after the initial time. As such, the time-averaged trend is a suitable determination of $R_{RNR\_decrease}$ for use in calculating $\Delta T_{min}$.

Alternatively, $R_{RNR\_decrease}$ can be determined over the course of two or three time slots following the initial time, and then applied to determine $\Delta T_{min}$. For example, let BTS 604-2 detect $\Delta P_{RNR}$=2 dB at the initial time 607-5 when BTS 604-1 broadcasts RAB 611-2. Further, assume that BTS 604-2 measures a decrease of 0.28 dB in each of the next two time slots. Then the rate of decrease would be (0.28+0.28) dB/2=0.28 dB per time slot, from which it would follow that $\Delta T_{min}$=7.14 time slots. The RAB offset would thus be set to 8 time slots relative to the initial time slot. In this example, $R_{RNR\_decrease}$ determined over just the first two time slots following the initial time is applied to determine the total number of time slots in the RAB offset.

As another example, if $R_{RNR\_decrease}$ determined from the first two time slots is 0.5 dB per time slot, then the $\Delta T_{min}$ and the RAB offset would be 4 time slots. It will be appreciated that these numerical examples are serve to illustrate the example embodiment, and are not intended to be limiting.

In accordance with the example embodiment, the determinations of both rate of decrease of RNR and the RAB offset are carried out by the BSC (or other control device). In a typical wireless communication system, RNR in a given sector is measured by the BTS of the sector. The BTS may thus also track the decrease (or increase, for example) in RNR, and thereby compute the rate of decrease (or increase) of RNR. Hence, the actual determinations attributed to the BSC in the example embodiment could correspond to receipt of a message or other form of communication from the BTS that includes measured RNR values and/or decrease rate. The BSC could then determine the RAB offset as described above. Alternatively, the BTS could provide the BSC with just the RNR values and the corresponding time slots, and the BSC itself could calculate the rate of decrease of RNR.

In an alternative embodiment, a given sector could be provided with the RAB offset of a neighboring sector, as well as an indication to use a later RAB offset. The given sector could by itself then determine both the rate of decrease of RNR as well as the RAB offset. In accordance with this alternative embodiment, the BSC would not necessarily make any of the determinations.

Finally, because the example method is based in part on a rate of decrease of RNR in a given sector initiated by an earlier RAB broadcast in a nearby or adjacent sector, the RAB offset in the given sector will not be dynamically adjusted when there is not or will not be a decrease in RNR initiated by the nearby sector's RAB broadcast. This occurs when the nearby sector broadcasts a RAB set to zero, indicating detection RNR below the threshold RNR. In this instance, the access terminals in the nearby sector will tend to increase their respective contributions to RNR in both sectors. Accordingly, when the nearby sector (e.g., sector 605-1 in the example illustrated in FIG. 6) broadcasts a RAB set to zero, the RAB offset in the given sector (e.g., sector 605-2 in the example illustrated in FIG. 6) will be set conventionally to the statically configured value.

4. IMPLEMENTATION OF EXAMPLE EMBODIMENTS

The example embodiment of dynamic reverse activity bit offset adjustment based on RF conditions described above can be implemented as a method in a base station controller (e.g., BSC, RNC, etc.) that is part of a wireless communication system that operates according to a CDMA family of protocols, such as the one described above in connection with FIG. 2. The next subsection provides logical steps and operations of the method of an example embodiment of dynamic reverse activity bit offset adjustment based on RF conditions. Example means for carrying out the method in a BSC, RNC, or the like are described in the subsequent subsection.

a. Example Method

Figure 7:
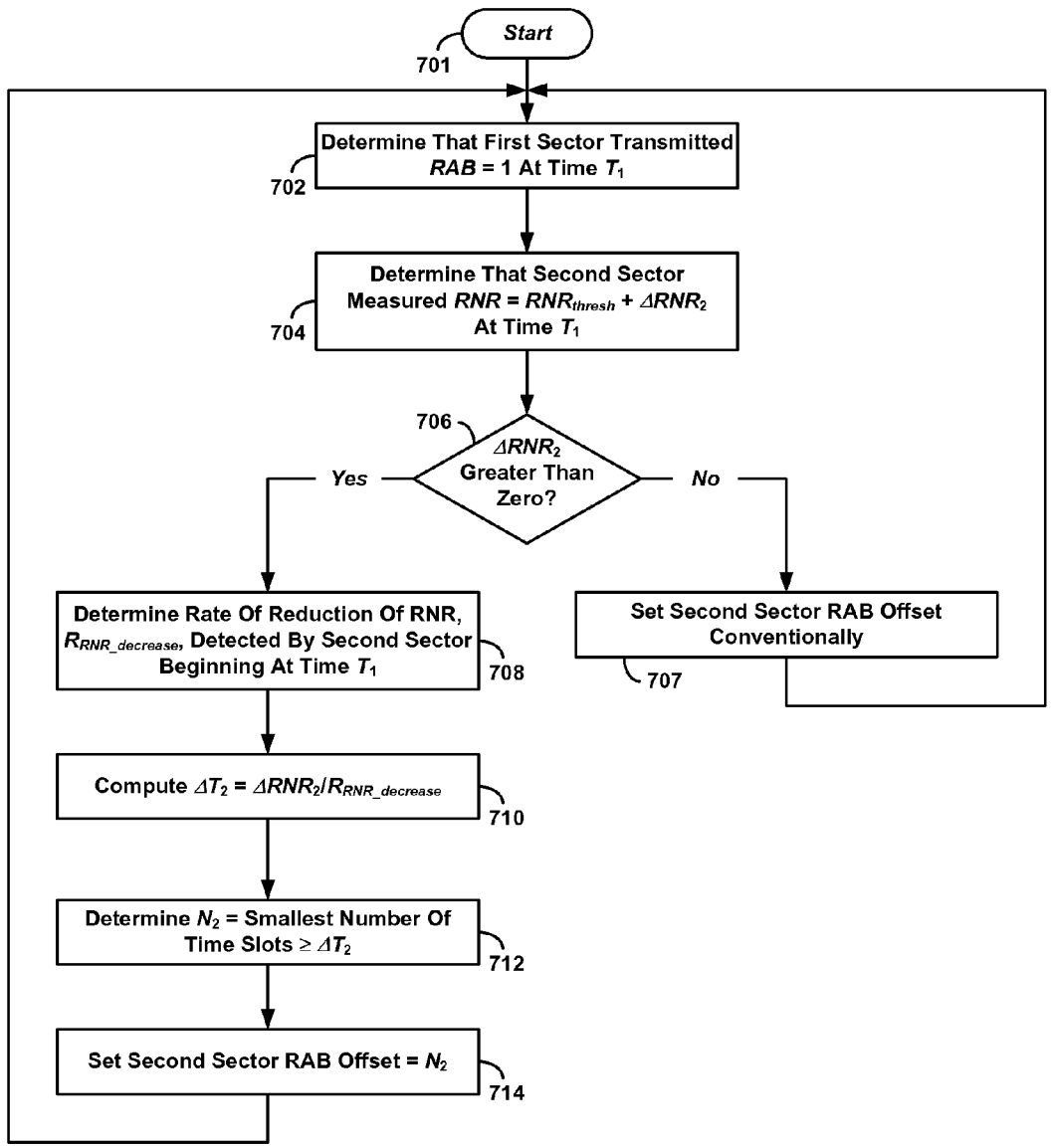
FIG. 7 illustrates an example embodiment of logical steps for implementing in a base station a method of dynamic reverse activity bit offset adjustment based on RF conditions.

FIG. 7 depicts an example method carried out by a BSC (or other control device) of the example embodiment of dynamic reverse activity bit offset adjustment based on RF conditions in the form of a logical flowchart. The steps could be implemented as software, firmware, and/or hardware instructions stored in physical memory of a BSC, RNC, or the like, and executed by one or more general purpose and/or special purpose processors. The executable instructions could also be stored on some form of non-transitory tangible computer readable storage medium, such as magnetic or optical disk, or the like, and provided for transfer to the BSC's memory during configuration or other step(s) for preparing the base station for operation.

At the start 701 the BSC is controlling a plurality of sectors, including at least a first sector and a second sector. Each sector is serving access terminals in active EVDO sessions. At step 702, the BSC determines the first sector has transmitted a RAB set to one. It may therefore be expected the second sector may observe a decrease in RNR.

At step 704, the BSC determines that at time $T_1$ the second sector measures an RNR excess of $\Delta RNR_2$. This would correspond to a detection of $RNR=RNR_{thresh}+\Delta RNR_2$ by the second sector. Note that $\Delta RNR_2$ corresponds to $\Delta P_{RNR}$ discussed above and $RNR_{thresh}$ corresponds to $P_{RNR\_threhold}$ also discussed above.

At step 706, the BSC determines whether or not $\Delta RNR_2$ is greater than zero. If it is not ("No" branch from step 706), then the second sector's RAB offset is set conventionally at step 707. This is because the second sector is detecting RNR at or below the threshold already, and therefore its RAB offset does not need to be dynamically adjusted. The process then returns to step 702.

If at step 706 the BSC determines that $\Delta RNR_2$ is greater than zero ("Yes" branch from step 706), then the BSC at step 708 determines $R_{RNR\_decrease}$, the rate of decrease of RNR detected by the second sector at time $T_1$.

The BSC at step 710 next computes $\Delta T_2=\Delta RNR_2/R_{RNR\_decrease}$. This is the amount of time necessary for RNR to decrease by $\Delta RNR_2$, and corresponds to $\Delta T_{min}$ in the above discussion.

At step 712, the BSC then determines $N_2$, the smallest number of time slots greater than or equal to $\Delta T_2$. Finally, at step 714, the BSC sets the RAB offset of the second sector to $N_2$, then returns to step 702.

It will be appreciated that the steps shown in FIG. 7 are meant to illustrate operation of an example embodiment of dynamic reverse activity bit offset adjustment based on RF conditions. As such, various steps could be altered or modified, and the ordering of certain steps could be changed, while still achieving the overall desired operation.

b. Example Base Station Controller

Figure 8:
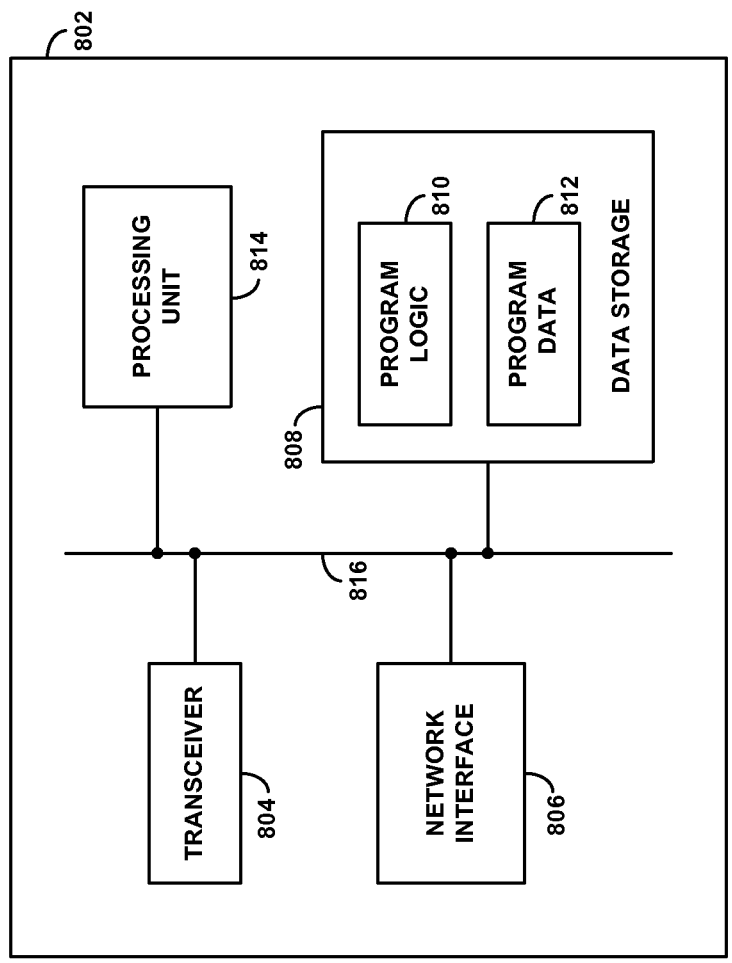
FIG. 8 is a block diagram of an example base station in which dynamic reverse activity bit offset adjustment based RF conditions may be implemented.

FIG. 8 is a simplified block diagram depicting functional components of an example a control device 802 (e.g., a BSC, RNC, or the like) in which dynamic reverse activity bit offset adjustment based on RF conditions may be implemented according, for example, to the example method described above. As shown in FIG. 8, the example control device 802, representative of BSC 206 in FIG. 2, for instance, includes a transceiver 804, network interface 806, a processing unit 814, and data storage 808, all of which may be coupled together by a system bus 816 or other mechanism. In addition, the control device may also include external storage, such as magnetic or optical disk storage, although this is not shown in FIG. 8.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of control device 802 relevant to dynamic reverse activity bit offset adjustment based on RF conditions are discussed briefly below.

Network interface 806 enables communication on a network, such network 200. As such, network interface 806 may take the form of trunk or optical link that can be coupled with a TDM switch such as MSC 208, or an Ethernet network interface card or other physical connection that can be coupled with PCF 214, for instance. Further, network interface 806 in combination with transceiver 804, which may control or manage one or more BTS antennas, enables air interface communication one or more access terminals, supporting reception of data frames on the ATs' reverse links and user traffic and control on the ATs' forward links.

Processing unit 814 comprises one or more general-purpose processors (e.g., INTEL microprocessors) and/or one or more special-purpose processors (e.g., dedicated digital signal processor, application specific integrated circuit, etc.). In turn, the data storage 808 comprises one or more volatile and/or non-volatile storage components, such as magnetic or optical memory or disk storage. Data storage 808 can be integrated in whole or in part with processing unit 814, as cache memory or registers for instance. As further shown, data storage 808 is equipped to hold program logic 810 and program data 812.

Program logic 810 may comprise machine language instructions that define routines executable by processing unit 814 to carry out various functions described herein. In particular the program logic, communication interface, and transceiver may operate cooperatively to carry out logical operation such as that discussed above and illustrated in FIG. 7.

It will be appreciated that there can be numerous specific implementations of dynamic reverse activity bit offset adjustment based on RF conditions, such control device 802 illustrated in FIG. 8. Further, one of skill in the art would understand how to devise and build such an implementation. As such, control device 802 is representative of means for carrying out the methods of dynamic reverse activity bit offset adjustment based on RF conditions in accordance with the functions and steps described herein by way of example.

5. CONCLUSION

An example embodiment of the present invention has been described above. Those skilled in the art will understand, however, that changes and modifications may be made to this embodiment without departing from the true scope and spirit of the invention, which is defined by the claims.

What is claimed:

1. In a device configured to control a plurality of wireless coverage areas of a wireless communication system, the plurality including at least a first wireless coverage area and a second wireless coverage area, a method comprising:
   at the device, determining that the first wireless coverage area has transmitted a first noise-indication message configured to instruct a first group of access terminals to reduce their respective contributions to a first aggregate reverse-link noise power detected by the first wireless coverage area;
   at the device, determining a rate of reduction of a second aggregate reverse-link noise power detected by the second wireless coverage area from a second group of access terminals after the first wireless coverage area has transmitted the first noise-indication message; and
   at the device, based at least on the determined rate of reduction, dynamically setting a relative time offset from transmission of the first noise-indication message from the first wireless coverage area to a subsequent transmission time for a second transmission of a second noise-indication message from the second wireless coverage area,
   whereby the second wireless coverage area will be caused to transmit the second noise-indication message at the subsequent transmission time.

2. The method of claim 1, wherein the first group of access terminals includes at least one access terminal that is also included in the second group of access terminals.

3. The method of claim 2, wherein the first group of access terminals are in soft handoff service within the first wireless coverage area and the second group of access terminals are in soft handoff service within the second wireless.

4. The method of claim 1, wherein determining the rate of reduction of the second aggregate reverse-link noise power detected by the second wireless coverage area comprises:
   making a first determination of the second aggregate reverse-link noise power detected by the second wireless coverage area and a later, second determination of the second aggregate reverse-link noise power detected by the second wireless coverage area; and
   determining a rate of decrease of the second aggregate reverse-link noise power from the first determination to the second determination.

5. The method of claim 4, wherein the device is further configured to operate according to a CDMA family of protocols, including at least IS-856,
   wherein the device is one of base station controller or a radio node controller, and each wireless coverage area of the plurality is a cell or a sector,
   wherein the second aggregate reverse-link noise power corresponds to reverse-noise rise (RNR) measured by the second wireless coverage area,
   and wherein determining a rate of decrease of the second aggregate reverse-link noise power from the first determination to the second determination comprises determining a rate of decrease in RNR measured by the second wireless coverage area over a time interval between the first determination and the second determination.

6. The method of claim 1, wherein dynamically setting the relative time offset based at least on the determined rate of reduction comprises:
   based on the determined rate of reduction, computing an amount of time required for the second aggregate reverse-link noise power detected by the second wireless coverage area to decrease below a threshold noise level; and
   setting the relative time offset to at least the computed amount of time.

7. The method of claim 6, wherein the device is further configured to operate according to a CDMA family of protocols, including at least IS-856,
   wherein the device is one of base station controller or a radio node controller, and each wireless coverage area of the plurality is a cell or a sector,
   wherein the first aggregate reverse-link noise power corresponds to a first reverse-noise rise (RNR) measured by the first wireless coverage area, and the second aggregate reverse-link noise power corresponds to a second RNR measured by the second wireless coverage area,
   wherein the first noise-indication message comprises a first Reverse Activity Bit (RAB) transmission with a value corresponding to detection of the first RNR above a first RNR threshold, and the second noise-indication message comprises a second RAB transmission,
   wherein the threshold noise level is a second RNR threshold,
   and wherein the relative time offset is a RAB offset measured in units of forward-link time slots.

8. The method of claim 1, further comprising:
   causing the second wireless coverage are to transmit an update message including an indication of the relative time offset to the second group of access terminals.

9. A device configured to control a plurality of wireless coverage areas of a wireless communication system, wherein the plurality includes at least a first wireless coverage area and a second wireless coverage area, the device comprising:
   one or more processors;
   memory accessible by the one or more processors; and
   computer-readable instructions stored in the memory that upon execution by the one or more processors cause the device to carry out functions including:
   determining that the first wireless coverage area has transmitted a first noise-indication message configured to instruct a first group of access terminals to reduce their respective contributions to a first aggregate reverse-link noise power detected by the first wireless coverage area;
   determining a rate of reduction of a second aggregate reverse-link noise power detected by the second wireless coverage area from a second group of access terminals after the first wireless coverage area has transmitted the first noise-indication message; and
   based at least on the determined rate of reduction, dynamically setting a relative time offset from transmission of the first noise-indication message from the first wireless coverage area to a subsequent transmission time for a second transmission of a second noise-indication message from the second wireless coverage area,
   whereby the second wireless coverage area will be caused to transmit the second noise-indication message at the subsequent transmission time.

10. The device of claim 9, wherein the first group of access terminals includes at least one access terminal that is also included in the second group of access terminals.

11. The device of claim 10, wherein the first group of access terminals are in soft handoff service within the first wireless coverage area and the second group of access terminals are in soft handoff service within the second wireless.

12. The device of claim 9, wherein determining the rate of reduction of the second aggregate reverse-link noise power detected by the second wireless coverage area comprises:
 making a first determination of the second aggregate reverse-link noise power detected by the second wireless coverage area and a later, second determination of the second aggregate reverse-link noise power detected by the second wireless coverage area; and
 determining a rate of decrease of the second aggregate reverse-link noise power from the first determination to the second determination.

13. The device of claim 12, wherein the device is further configured to operate according to a CDMA family of protocols, including at least IS-856,
 wherein the device is one of base station controller or a radio node controller, and each wireless coverage area of the plurality is a cell or a sector,
 wherein the second aggregate reverse-link noise power corresponds to reverse-noise rise (RNR) measured by the second wireless coverage area,
 and wherein determining a rate of decrease of the second aggregate reverse-link noise power from the first determination to the second determination comprises determining a rate of decrease in RNR measured by the second wireless coverage area over a time interval between the first determination and the second determination.

14. The device of claim 9, wherein dynamically setting the relative time offset based at least on the determined rate of reduction comprises:
 based on the determined rate of reduction, computing an amount of time required for the second aggregate reverse-link noise power detected by the second wireless coverage area to decrease below a threshold noise level; and
 setting the relative time offset to at least the computed amount of time.

15. The device of claim 14, wherein the device is further configured to operate according to a CDMA family of protocols, including at least IS-856,
 wherein the device is one of base station controller or a radio node controller, and each wireless coverage area of the plurality is a cell or a sector,
 wherein the first aggregate reverse-link noise power corresponds to a first reverse-noise rise (RNR) measured by the first wireless coverage area, and the second aggregate reverse-link noise power corresponds to a second RNR measured by the second wireless coverage area,
 wherein the first noise-indication message comprises a first Reverse Activity Bit (RAB) transmission with a value corresponding to detection of the first RNR above a first RNR threshold, and the second noise-indication message comprises a second RAB transmission,
 wherein the threshold noise level is a second RNR threshold,
 and wherein the relative time offset is a RAB offset measured in units of forward-link time slots.

16. The device of claim 9, wherein the functions further include:
 causing the second wireless coverage are to transmit an update message including an indication of the relative time offset to the second group of access terminals.

17. A non-transient computer-readable medium having stored thereon computer-executable instructions that, if executed by a processor of a device configured to control a plurality of wireless coverage areas of a wireless communication system, wherein the plurality includes at least a first wireless coverage area and a second wireless coverage area, cause the device to perform functions comprising:
 determining a rate of reduction of a second aggregate reverse-link noise power detected by the second wireless coverage area from a second group of access terminals after the first wireless coverage area has transmitted the first noise-indication message; and
 based at least on the determined rate of reduction, dynamically setting a relative time offset from transmission of the first noise-indication message from the first wireless coverage area to a subsequent transmission time for a second transmission of a second noise-indication message from the second wireless coverage area,
 whereby the second wireless coverage area will be caused to transmit the second noise-indication message at the subsequent transmission time.

18. The non-transient computer-readable medium of claim 17, wherein determining the rate of reduction of the second aggregate reverse-link noise power detected by the second wireless coverage area comprises:
 making a first determination of the second aggregate reverse-link noise power detected by the second wireless coverage area and a later, second determination of the second aggregate reverse-link noise power detected by the second wireless coverage area; and
 determining a rate of decrease of the second aggregate reverse-link noise power from the first determination to the second determination.

19. The non-transient computer-readable medium of claim 18, wherein the device is further configured to operate according to a CDMA family of protocols, including at least IS-856,
 wherein the device is one of base station controller or a radio node controller, and each wireless coverage area of the plurality is a cell or a sector,
 wherein the second aggregate reverse-link noise power corresponds to reverse-noise rise (RNR) measured by the second wireless coverage area,
 and wherein determining a rate of decrease of the second aggregate reverse-link noise power from the first determination to the second determination comprises determining a rate of decrease in RNR measured by the second wireless coverage area over a time interval between the first determination and the second determination.

20. The non-transient computer-readable medium of claim 17, wherein dynamically setting the relative time offset based at least on the determined rate of reduction comprises:
 based on the determined rate of reduction, computing an amount of time required for the second aggregate reverse-link noise power detected by the second wireless coverage area to decrease below a threshold noise level; and
 setting the relative time offset to at least the computed amount of time.

21. The non-transient computer-readable medium of claim 20, wherein the device is further configured to operate according to a CDMA family of protocols, including at least IS-856, wherein the device is one of base station controller or a radio node controller, and each wireless coverage area of the plurality is a cell or a sector, wherein the first aggregate reverse-link noise power corresponds to a first reverse-noise rise (RNR) measured by the first wireless coverage area, and the second aggregate reverse-link noise power corresponds to a second RNR measured by the second wireless coverage area, wherein the first noise-indication message comprises a first Reverse Activity Bit (RAB) transmission with a value corresponding to detection of the first RNR above a first RNR threshold, and the second noise-indication message comprises a second RAB transmission, wherein the threshold noise level is a second RNR threshold, and wherein the relative time offset is a RAB offset measured in units of forward-link time slots.

22. The non-transient computer-readable medium of claim 17, wherein the functions further comprise:

causing the second wireless coverage are to transmit an update message including an indication of the relative time offset to the second group of access terminals.

* * * * *